(12) United States Patent
Wortberg et al.

(10) Patent No.: US 11,904,782 B2
(45) Date of Patent: Feb. 20, 2024

(54) PRODUCTION METHOD FOR A VEHICLE NETWORK OF A VEHICLE, AND VEHICLE NETWORK

(71) Applicant: Lisa Dräxlmaier GmbH, Vilsbiburg (DE)

(72) Inventors: Michael Wortberg, Dorfen (DE); Dominik Eberl, Vilsbiburg (DE)

(73) Assignee: LISA DRAXLMAIER GMBH, Vilsbiburg (DE)

( * ) Notice: Subject to any disclaimer, the term of this patent is extended or adjusted under 35 U.S.C. 154(b) by 159 days.

(21) Appl. No.: 17/311,328

(22) PCT Filed: Nov. 12, 2019

(86) PCT No.: PCT/EP2019/080914
§ 371 (c)(1),
(2) Date: Jun. 5, 2021

(87) PCT Pub. No.: WO2020/114726
PCT Pub. Date: Jun. 11, 2020

(65) Prior Publication Data
US 2022/0118924 A1    Apr. 21, 2022

(30) Foreign Application Priority Data

Dec. 6, 2018  (DE) .......................... 102018131199.0

(51) Int. Cl.
*B60R 16/03* (2006.01)
*B60R 16/02* (2006.01)
*B60R 16/023* (2006.01)

(52) U.S. Cl.
CPC ...... *B60R 16/0315* (2013.01); *B60R 16/0207* (2013.01); *B60R 16/0231* (2013.01)

(58) Field of Classification Search
CPC ..... B60R 16/03; B60R 16/0315; B60R 16/02; B60R 16/0207; B60R 16/023; B60R 16/0231
See application file for complete search history.

(56) References Cited

U.S. PATENT DOCUMENTS

2004/0227402 A1   11/2004  Fehr et al.

FOREIGN PATENT DOCUMENTS

DE   102014222878 A1   5/2016
EP      0475406 A2      3/1992
(Continued)

OTHER PUBLICATIONS

Machine Language Translation into English of DE 102014222878 (A1).

*Primary Examiner* — Robert L Deberadinis
(74) *Attorney, Agent, or Firm* — Jacob Eisenberg

(57) ABSTRACT

A network for a vehicle and a method of making the network is described. The network is suitable for a number of vehicle network subscribers in at least two topology levels which can be distinguished spatially or functionally. An energy supply device, at least one control unit, at least one interface module, a communication interface; a number of load interfaces, at least one load interface, at least one matrix coupler are provided. The matrix coupler is set up to represent an unbundling task for linking the vehicle network subscribers, where nodes of a line-connector relationship of the graph representing the matrix-coupler in each case denotes a load interface of the number of load interfaces at the end of a line. Here, an edge of the graph denotes a connection relationship of at least one line between a first load interface and a second load interface.

15 Claims, 7 Drawing Sheets

(56) References Cited

FOREIGN PATENT DOCUMENTS

| | | |
|---|---|---|
| GB | 2167885 A | 6/1986 |
| WO | WO0149532 A1 | 7/2001 |

|    | 1 | 2 | 3 | 4 | 5 | 6 | 7 | 8 | 9 | 12 |
|----|---|---|---|---|---|---|---|---|---|----|
| 1  |   | 1 |   |   |   |   |   |   |   |    |
| 2  | 1 |   | 1 | 1 | 1 | 1 | 1 | 1 | 1 |    |
| 3  |   | 1 |   |   |   | 1 |   | 1 |   | 1  |
| 4  |   | 1 |   |   | 1 |   |   | 1 | 1 |    |
| 5  |   | 1 |   | 1 |   |   | 1 |   |   |    |
| 6  |   | 1 | 1 |   |   |   | 1 |   |   |    |
| 7  |   | 1 |   |   | 1 | 1 |   |   |   |    |
| 8  |   | 1 | 1 | 1 |   |   |   |   | 1 |    |
| 9  |   | 1 |   | 1 |   |   |   | 1 |   | 1  |
| 12 |   |   | 1 |   |   |   |   |   | 1 |    |

Fig. 7

|    | 1 | 22 | 3 | 4 | 5 | 6 | 7 | 8 | 9 | 12 |
|----|---|----|---|---|---|---|---|---|---|----|
| 1  |   | 1  |   |   |   |   |   |   |   |    |
| 22 | 1 |    | 1 | 1 | 1 | 1 | 1 | 1 | 1 | 1  |
| 3  |   | 1  |   |   |   |   |   |   |   |    |
| 4  |   | 1  |   |   |   |   |   |   |   |    |
| 5  |   | 1  |   |   |   |   |   |   |   |    |
| 6  |   | 1  |   |   |   |   |   |   |   |    |
| 7  |   | 1  |   |   |   |   |   |   |   |    |
| 8  |   | 1  |   |   |   |   |   |   |   |    |
| 9  |   | 1  |   |   |   |   |   |   |   |    |
| 12 |   | 1  |   |   |   |   |   |   |   |    |

Fig. 8

PRODUCTION METHOD FOR A VEHICLE NETWORK OF A VEHICLE, AND VEHICLE NETWORK

CROSS REFERENCE TO RELATED APPLICATIONS

This application is a national phase application of International Application No. PCT/EP2019/080914, filed on 12 Nov. 2019, and claims the priority benefit of German Application 102018131199.0, filed on 6 Dec. 2018, the content of both of which is incorporated herein by reference.

BACKGROUND OF THE INVENTION

The present disclosure relates to a vehicle network for vehicles, on the one hand, and to an automated production method for producing the physical wiring harness, on the other. Against the background and backdrop of increasing complexity of and in vehicle network systems as well as the increasing demands on vehicle network systems per se, such as functional safety requirements, the heretofore manual production of wiring harnesses is fraught with risks in terms of quality, robustness and complexity control.

The present disclosure is described in the following mainly in connection with switching elements for vehicle network systems. However, the present disclosure can apply in any application in which electrical loads are switched.

As is known in the arts of vehicle electrical or electronic components, electrical power sources, circuit elements, electrical load and control units are electrically conductive and/or interconnected by a function-based or custom-configured electric wiring set. In this way, a vehicle network of the vehicle is formed, in which information is exchanged between the various vehicle network components or the components are supplied with electrical energy. Such a line set, which can also be called a wire harness, consists essentially of electrical conductors, electrical lines, or electrical connectors attached thereto, and the like.

The configuration of such a wiring harness is often carried out with the aid of an assembly device in the form of a so-called laying board, which has a plurality of appropriately positioned nails or pins for this purpose. On the laying board, the individual electrical conductors, or electrical lines of the wiring harness to be produced, are guided or arranged spatially according to the functional and/or geometric requirements of the wiring harness.

On the one hand, the vehicle network connects an energy source to the various loads or consumers in the vehicle via distributors and sub-distributors. The components of the vehicle network include power distributors such as distributors and sub-distributors as well as loads, as well as the lines that connect them. The wires can be connected to the interfaces of the distributors, sub-distributors or loads via plug connections.

In motor vehicles, more and more electronic circuits are used in the vehicle network. More and more electronic circuits using (networked) control devices are installed in a motor vehicle, which exchange switching information or commands or switching loads with each other. Due to the developments towards autonomous driving, the topic of functional safety is becoming increasingly important. A distinction is made between a quasi-conventional part and a highly available safety part for both the control units and the connected loads.

Today's vehicles already have safety-relevant functions, such as the automated steering of the parking function. These functions must be designed with failsafes, which means that when an error is detected, the safe state is "off" and the driver is notified via display instruments accordingly. Autonomous driving systems, on the other hand, must be designed to fail-operational with an error state transition to the safe state "on". The failure of the supply of power supply (supply line) or communication (bus line) for this function can lead to a direct danger to people. This safe state "on" must be maintained until the vehicle can be stopped in a safe place or until the driver can take control. Since the safe state is "on", the supply becomes relevant to meeting the safety target.

The increased requirements on fault-free wiring harnesses are in contrast to the ever-increasing complexity of the wiring harness. The complexity is the cause of errors in the development and production of the wiring harness. Basically, the wiring harness has to fulfill three tasks: 1. provide electrical connections for the power supply from the battery and/or generator. 2. provide electrical connection for communication, and 3. perform an unbundling of the connections in the vehicle network. It is point 3. the unbundling, that is, the deep linkage of the connection relationships of the vehicle network subscribers, which constitutes the complexity of the wiring harness set.

The deep connection of the electrical network subscribers can be shown by way of the following example: a central control unit has a large connector with >50 contacts. The wires that originate from this connector end are from 20 different connectors of other network subscribers (control devices, sensors, actuators). The connectors of the other vehicle network subscribers contain wires which lead to further vehicle network subscribers and the like. So, there are almost no one-to-one relationships of connectors and mating connectors. Instead, almost every connector is mixed with wires that connect to various other vehicle electrical networks.

In order to master the complexity in the production of the wiring harness, the wiring harness is broken down into modules and these are prefabricated in a so-called module construction.

Modules are selected according to their affiliation to functions; often, even after a new approach to zonality, attempts are made to combine a topological affiliation according to topology levels. However, these modules have many open ends and incompletely equipped plugs, because due to the deep linkage there is generally no part of the wiring harness that can be detached as a complete module. In the so-called "assembly" (assembly), the individual modules are combined on a building board. The connections between the modules must be made here in the form of manual re-plugging into the still incompletely equipped connectors. This manual re-plugging is often a source of errors.

The wiring harness production is very time-consuming and requires a lot of space. The various modules are manufactured on different building boards, then they have to be removed from these and stored. They are retrieved from the warehouse according to the pearl chain of the production of customer-specific wiring harness and combined on an assembly building board to form a complete wiring harness. In the process, the connection between the modules must be made via manual re-plugging After completion of the wiring harness via winding and attachment of retaining parts, the complete wiring harness is removed from the assembly board. It must then be placed in connection with a final tester in a complex procedure. All plugs must be contacted via needle adapters. Continuity tests are used here to determine whether errors have occurred during manual connection.

BRIEF SUMMARY OF THE INVENTION

An object of the present invention is therefore to design an on-board vehicle network using the simplest possible means of construction and that can be produced with as little manual effort as possible.

Since the described deep interdependence of the connections in the cable set is a cause of the complexity, this is theoretically considered for the inventive solution and supplied to a complexity reduction based on the theoretical consideration. Graph theory deals with the modelling of interdependence in networks and is particularly suitable for this purpose.

The connectors or contact elements or interfaces in a wiring harness are the nodes of a graph. The line connections with at least one line from one connector to another connector are the edges of the graph. For the conventional automotive wiring harness, one thus obtains a generally connected, non-flat, non-regular graph with several hundred edges and nodes. The eigenvector can be determined from the adjacency matrix of the graph of the conventional wiring harness, which describes the interconnection relationships of the nodes with each other. This is asymmetric for the conventional wiring harness and has no zero positions. This is an indication that the graph is irregular and multi-layered (not flat) and cannot be easily broken down into sub-graphs.

The theoretical consideration assumes that the vehicle network can be divided into topology levels. Criteria for the affiliation of vehicle network subscribers to topology levels can be functional aspects (e.g., affiliation to customer-selectable equipment) as well as spatial/topological aspects. Another important aspect for defining topology levels is functional safety. Connections with the functional safety requirements can thus be combined and encapsulated in their own topology levels. A vehicle network subscriber can generally be understood as loads, sensors and/or actuators.

If a model is based on the assumption that a vehicle network can be divided into at least two topology levels, the previously connected, non-flat, non-regular graph of the conventional vehicle network is divided into at least two partite subnetworks (partitions) according to graph theory in order to reduce complexity. This results in a multi-partite graph or k-partite graph. For this purpose, a matrix coupler is preferably added to the power distributor or to another subscriber of the vehicle network, which takes over the task of unbundling.

In graph theory, a multi-partite graph or k-partite graph is a simple graph whose set of nodes breaks down into k disjoint subsets, so that the nodes of each of these subsets are not adjacent to each other. For k=2, these graphs are called bipartite graphs. A k-partition of a graph is a breakdown of the set of nodes into k disjoint subsets, so that no adjacent knots are in the same set. Such a k partition is not unique. It is quite possible that there are multiple k partitions that meet this property. A graph is now called k-partite if it has a k partition. The graph is called fully k-partite if each node is connected to all nodes of all other k-partitions.

A bipartite graph, also called a pair graph, is a mathematical model for relationships between the elements of two sets. A simple graph is called bipartite or pair, if its nodes can be divided into two disjoint subsets, so that there are no edges between the nodes within both subsets. Simplified, a bipartite graph is a graph in which two sets of nodes exist within which no nodes are connected to each other. The graph is called fully bipartite if a bipartition exists, so that each node from the first disjoint subset is connected to each node from the second disjoint subset. A fully bipartite graph, where the number of nodes of one of the two disjoint subsets is equal to one, is called a star graph. The bipartite graph is suitable for the study of assignment problems. Furthermore, many graphene properties can be calculated for bipartite graphs with significantly less effort than is generally possible.

An adjacency matrix of a graph, also called a connection matrix or neighborhood matrix, is a matrix that stores which nodes of the graph are connected by an edge. It has a row and a column for each node, resulting in an n×n matrix for n nodes. An entry in the i-th row and j-th column indicates whether an edge leads from the i-th to the j-th node. If there is a 0 at this point, there is no edge—a 1 indicates that an edge exists. The representation of a graph as a matrix allows the use of linear algebra methods. The application and study of such methods is a central topic in spectral graph theory. It thus forms an interface between graph theory and linear algebra.

The matrix coupler takes over the unbundling task and the inventive shape of the vehicle network thus has the following characteristics when implementing a bipartite graph:

If p1, p2 . . . pn are the nodes of a bipartition, which can be assigned to the connected network subscribers, then: there are no edges, between the nodes of the electrical network pi-pj. Instead, each of the nodes p1, p2 . . . pn can be assigned a corresponding node q on the matrix coupler. If the matrix coupler can be regarded as an interface node q according to the graph theory, then the bipartite graph of a bipartition simplifies further to a star graph.

The connections of a star graph can be represented as point-to-point connections in the physical cable set. The cable set is therefore freed from the unbundling task and its complexity is considerably reduced.

The matrix coupler can be designed to physically implement a multi-partite graph, i.e., k-partite graph, accordingly.

The complexity reduction of the physical wiring harness, or a large subset thereof, enables its automated production. The star graph shape frees a manufacturing device from the following challenges:

1. No assembly of the connectors from different modules (which in the new structure act as bipartitions or topology layers). Therefore, no re-plugging is necessary in production.
2. Serial producible point to point structure, no loops, no splices (splice, cable connection)
3. The bipartitions can be produced automatically without a building board, due to their simple structure.
4. A test for correct insertion (continuity test) can be performed at the bipartition level. The complex final test of the entire wiring harness after assembly can thus be omitted at least to a large extent.

The invention relates to a method for producing a vehicle network system of a vehicle, comprising the steps of providing, feeding and coupling. The steps of feeding and coupling are repeated according to the number of loads. In a first step of providing, a plurality of vehicle network subscribers are provided in at least two topology levels to be distinguished spatially or functionally, an energy supply device, and at least one control device. In a second step of providing an interface module for the vehicle electrical system is provided. A first line set segment is then fed. The first line set segment comprises at least one first communication line segment and one first power supply line segment. Here, a first end of the first communication line segment and of the first power supply line segment are bundled together at a first end of the at least one-line set segment in a first interface. An interface can also be a contact part, a plug or a socket. A communication line segment can be understood as a data line. The data line, for example, that is to say the communication line segment, can be designed as a twisted pair line, coax line, foil conductor or similar. In the coupling step, a second end of the first line segment opposite the first end is coupled to a first load interface of the number of load interfaces of the interface module.

The interface module for the vehicle electrical system comprises a supply interface for coupling to a positive pole of the energy supply device of the vehicle, a communication interface for receiving and/or transmitting information from a coupled or connectable control unit of the vehicle, a number of load interfaces and at least one matrix coupler. A load interface can be understood as a physical connector interface, a vehicle network subscriber interface or, more generally, an interface of the interface module to the vehicle network subscribers connected thereto. Thus, individual load interfaces can ultimately also be understood as actuator interfaces. In each case, at least one load interface of the number of load interfaces is assigned to a vehicle network subscriber of the plurality of vehicle network subscribers.

The matrix coupler is designed to couple the supply interface and the communication interface respectively with each load interface of the number of load interfaces and thus represent an interface between the at least two topology levels to be distinguished. The matrix coupler is further designed to represent an unbundling task for linking the vehicle network subscribers to one another. Here, nodes of a graph representing line-connector relationships of the matrix coupler each denote a load interface of the number of load interfaces at the end of a line.

The matrix coupler is designed to couple the supply interface and the communication interface to each load interface of the number of load interfaces and thus to represent an interface between the at least two topology levels to be distinguished. The matrix coupler is further configured to represent an unbundling task for interconnecting the vehicle network subscribers. Here, nodes of a graph representing line-connector relationships of the matrix coupler each denote a load interface of the number of load interfaces at the end of a line. Further, a first edge of the graph describes a connection relationship of at least one first line between a first load interface and a second load interface. Furthermore, a second edge of the graph describes a connection relationship of at least one second line between a third load interface and a fourth load interface, etc.

As already described in the introduction, a complex interaction of the vehicle network subscribers with one another takes place in a vehicle on-board network. The matrix coupler is designed to solve the unbundling task of this complex interaction of the vehicle network subscribers with each other. Thus, all vehicle network subscribers can be coupled to the matrix coupler and also use it to establish interaction with the other vehicle network subscribers. The matrix coupler thus establishes a link between the vehicle network subscribers.

The matrix coupler is set up to solve the unbundling task of this complex interaction of the vehicle network subscribers with each other. In this way, all the vehicle network subscribers can be coupled to the matrix coupler and also establish interaction with the other vehicle network subscribers via this coupler. In this way, the matrix coupler establishes a link between the vehicle network subscribers.

Generally, the graph comprises at least two partite graphs having at least two partitions, wherein the eigenvector of a respective adjacent matrix of the at least two partitions is symmetrically to zero. Thereby, at least one node of each graph is located on the matrix coupler. The graph can comprise, for example, two bipartite graphs with two bipartitions, wherein in each case the eigenvector of a respective adjacent matrix of the two bipartitions is symmetrical to zero, in the form [k,0. 0,-k] or [k,-k,0 . . . 0].

The matrix coupler is suitable for displaying the unbundling task for the connection of the vehicle network subscribers. If the edge of a graph is defined as the connection relation of at least one line (line set segment) from one interface, for example, connector to another interface, for example, connector and if the nodes of the graph are defined as the interface respectively at the end of a line in the form of a connector or a transfer support point or splice, then/the following applies:

by introducing the matrix coupler (MK), the irregular graph representing the line-connector relationships is replaced, for example, by two bipartite graphs with the bipartitions TE1-MK and TE2-MK. The graphs of each of the two bipartitions are characterized in that the eigenvectors of their adjacent matrices (connecting matrices) are symmetrical to zero in the form [k,0. 0,-k] or [k,-k,0 . . . 0]. In general, the irregular graph is converted into a multipartite graph with a corresponding number of partitions.

1. A node of each graph is located on the matrix coupler. If all nodes on the matrix coupler of a bipartition can be combined to one node (an interface and/or a connector on the matrix coupler for each bipartition), the graph of the bipartition is a star graph. The edge length of a path can be greater than one.
2. Exceptions may be made for special lines whose interfacing via a matrix coupler is not technically and/or economically sensible. These are then arranged in an independent wiring harness layer.

The interface module is designed to carry out an electrical fuse protection of the number of load interfaces to the vehicle network subscribers. Electrical protection can be understood as protecting a line, a vehicle network subscribers or other equipment from damage caused by excessive heating resulting from the excess current flowing over a longer period of time. An overcurrent can be caused by an overload or short circuit. For example, an electrical fuse can also be called an electrical fuse or OCP (=Over Current Protection). The electrical protection can interrupt an electrical circuit if the electrical current exceeds a specified current intensity beyond a specified time. The electrical protection can be designed, for example, as a fuse, a circuit breaker or an electronic fuse.

One advantage of the vehicle network described here is that the vehicle network can be sequentially, one-dimensionally produced by solving the unbundling task within the interface module. This allows a high degree of automation to be achieved. Furthermore, at least in the case of module production, the otherwise usual building boards can be dispensed with. Due to the high degree of automation, quality can be increased during the production process and/or reproducible results can be achieved. This makes it easier to meet the requirements for highly automated driving.

The electrical protection of the load interfaces and thus the wiring harness segments to the vehicle network subscribers can be carried out electronically with Mosfet switches and intelligent protection characteristic. The electronic fuses can be part of the interface module. A Mosfet switch can be understood as a metal oxide semiconductor field effect transistor (MOSFET also known as MOS-FET or MOST). The Mosfet switch belongs to the insulated gate field-effect transistors, also known as IGFET. Although doped polysilicon is the predominant gate material today, the term MOSFET has been retained.

The interface module can be designed to provide a control function and/or a sensor evaluation for one vehicle network subscriber, a plurality of vehicle network subscribers or all vehicle network subscribers of the connected plurality of vehicle network subscribers.

The number of load interfaces can be configured as a plug or socket or transfer support point or splice. A load interface represents a transfer point to a wire harness segment, via which a vehicle network subscriber can be connected or is connected.

The wiring harness segment to be supplied can be assembled with a step of assembling the wiring harness segment before the step of feeding the wiring harness segment. For each load of the plurality of loads, a wiring harness segment can be assembled, which wiring harness segment comprises at least one communication line segment and at least one energy supply line segment of the same length.

In each case, a first end of the communication line segment and a first end of the wiring harness segment can be bundled at a first end of the wiring harness segment in an interface, such as a contact part or connector, to be mechanically and electrically coupled via the interface to the associated vehicle network subscriber, such as a load, an actuator or a sensor.

The communication line segment can be formed as a film conductor. A film conductor can be understood as a conductor arrangement for transmitting differential communication signals. A film conductor can comprise a conductor carrier, a number of pairs of first conductors, also called lead conductors, wherein two of the first conductors are electrically coupled to each other at their ends, and a number of pairs of second conductors, also called return conductors, two of the second conductors are electrically coupled to each other at their ends. Thus, as a conductor bundle, one of the first conductors of a pair and one of the second conductors of a pair may be arranged together on a first side of the conductor carrier, and the further first conductor of the respective pair and the further second conductor of the respective pair may be arranged on a second side of the conductor carrier.

In a film conductor, conductors can therefore be arranged in pairs on different sides of the conductor carrier.

The arrangement of two conductors on each side of the conductor carrier of the film conductor results in field arrangements which mutually cancel each other out in a twisted pair line in the far field, similar to the fields in a twisted pair line. At the same time, the immunity of the conductor arrangement against external disturbances is increased.

Since the conductor arrangement as a film conductor has no twisted conductors, there is no impact length of the individual turns. As a result, the lay length cannot vary and thus does not have a negative impact on the data transmission. At the same time, the mechanical stability of the conductor arrangement is ensured by the conductor carrier.

It is understood that the conductor arrangement can, for example, be designed as a so-called film conductor, in which the conductor carrier has a flexible, electrically insulating material on which the conductors can be arranged.

Such a flexible, electrically insulating material is usually used to produce flat conductors which normally do not allow expansion (both in length and width). However, such conductors can be kinked, twisted or bent without damaging the conductors. Consequently, such conductors can be used as flexibly as cables.

In the step of providing the interface module, the interface module can have a ground interface for coupling to a negative pole of the energy supply device. A ground line can then be supplied in the supply step. The matrix coupler can be designed to couple the ground interface to at least one load interface, to couple to a part of the load interface, or to couple to each of the number of load interfaces, respectively. This can also be done by connecting to a ground connection of the vehicle, whereby a connection to the negative pole of the energy supply device is then indirectly made.

The interface module can have a DC voltage converter. The DC converter can be connected to the supply interface on the input side. The DC converter can be set up to convert the first voltage level present at the supply interface to a second voltage level different from the first voltage level and, to provide the second voltage level to the matrix coupler on the output side. The matrix coupler can be configured to provide the first voltage level and, simultaneously or alternatively, the second voltage level to the number of load interfaces individually. For example, the first voltage level can be provided to a first load interface, the second voltage level to a second load interface, and both the first voltage level and the second voltage level to a third load interface.

The first voltage level can be higher than the second voltage level. For example, the first voltage level can be 48 V and the second voltage level can be 12 V. This is a nominal range that covers a corresponding tolerance range depending on the power supply system. The first voltage level of 48 V can indicate a working range between 36 V and 54 V. The actual voltage at the second voltage level of 12 V can be up to 14.4 V.

The invention relates to a vehicle network for a vehicle, comprising a plurality of loads, an energy supply device, at least one control unit, at least one interface module for the vehicle network, and a wiring harness segment per load of the plurality of loads. Each wiring harness segment has at least one first communication line segment and one first energy supply line segment. Thereby, a first end of each of the first communication line segment and of the first power supply line segment are bundled at a first end of the at least one wiring harness segment in a first interface.

The interface module comprises a supply interface for coupling to a positive pole of the vehicle's energy supply device, a communication interface for receiving and/or transmitting information from a coupled or connectable control unit of the vehicle, a number of load interfaces, and at least one matrix coupler designed to couple the supply interface and the communication interface to each of the number of load interfaces, respectively.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The following is an advantageous embodiment of the invention with reference to the accompanying figures. The drawing shows in:

FIG. 7 Adjacency matrix for the graph of the subset of a vehicle network according to the prior art;

FIG. 8 Adjacency matrix to the graph of the subset of a vehicle network with matrix coupler according to the present invention;

The figures are merely schematic representations and serve only to explain the invention.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
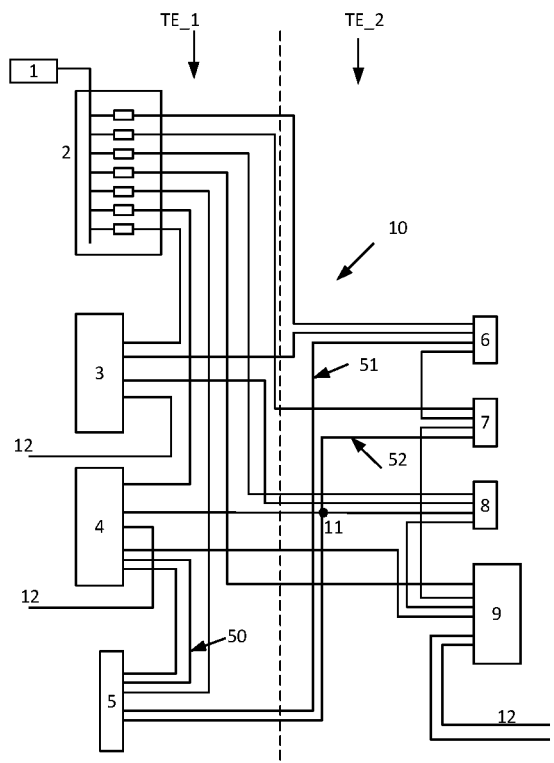
FIG. 1 An exemplary subset of a vehicle network according to the prior art.

FIG. 1 shows an exemplary subset of a vehicle network BN according to the state of the art. The network subscribers (control units, actuators, sensors) 3, 4, 5, 6, 7, 8, 9 draw their 12 V supply from a power distributor 2 which is fed by the battery 1. The wiring harness 10 has splices 11 to represent star-point connections in the conventional wiring harness. There are two topology levels TE_1 and TE_2. Accordingly, it would be advantageous to supply the vehicle network subscribers 3, 4 and 5 via a wiring harness module and subscribers 6, 7, 8 and 9 via a second wiring harness module. However, due to the cross connections of all subscribers, a division into two independent modules is not possible. Reference numeral 52 refers to an example of a connection between TE_1 and TE_2. Reference numeral 50 refers to a connection within TE_1.

Figure 2:
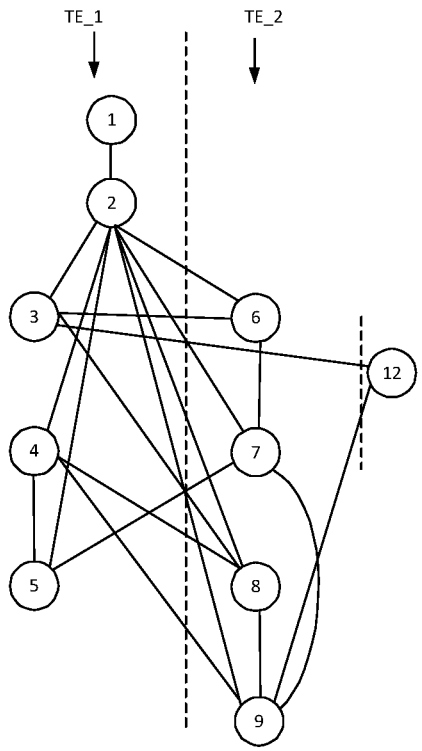
FIG. 2 Graph of the subset of a vehicle network according to the prior art.

FIG. 2 depicts a graph showing the connection relationships of the vehicle network subscribers 3, 4, 5, 6, 7, 8, 9 for the subset of a vehicle on-board network according to the prior art. Reference numeral 12 refers to a connection to other topology levels. The graph is not flat, not bipartite and a subdivision into sub-graphs according to TE_1 and TE_2 is not possible.

Figure 3:
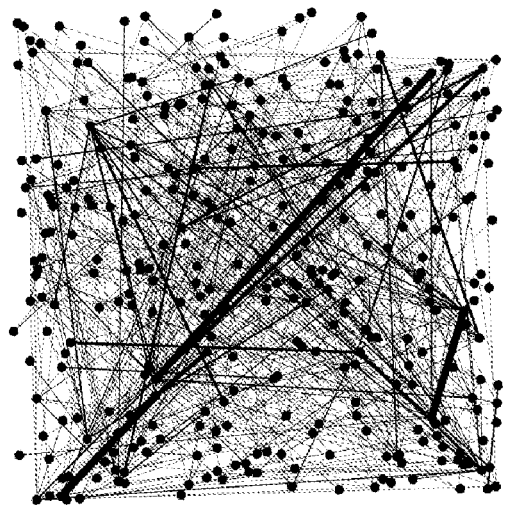
FIG. 3 Graph of a complete set of interior wiring harness according to the prior art.

FIG. 3 depicts a graph of a real interior wiring harness, that is, a vehicle network BN, according to the state of the art. Here, the complexity can be seen and the graph shows several levels of deep linkage.

Figure 4:
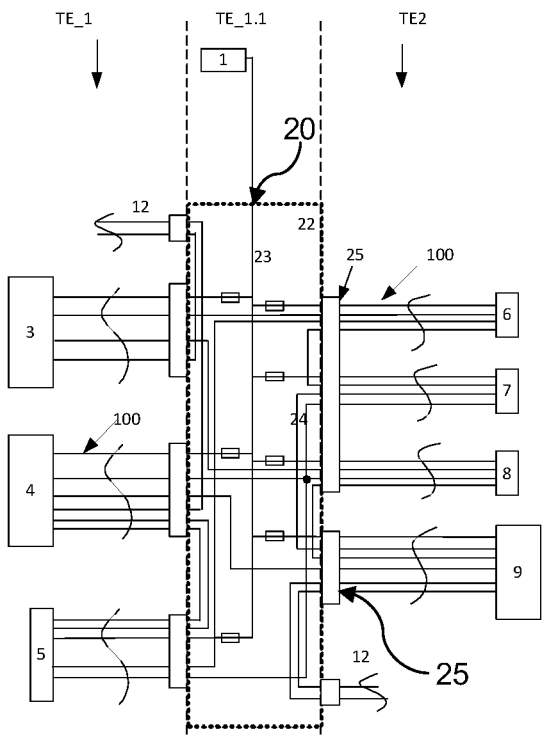
FIG. 4 Subset of a vehicle network with matrix coupler according to the present invention.

FIG. 4 depicts the inventive solution with the introduction of an interface module 22 which contains a matrix coupler 24. Furthermore, the interface module 22 contains the distribution structure 23 for the secure supply of the vehicle network subscribers 3, 4, 5, 6, 7, 8, 9 with battery voltage. The network subscribers 3, 4, 5, 6, 7, 8, 9 are connected to the interface module 22 via load interfaces 25. The energy supply device 1 is electrically coupled to the distribution structure 23 via a supply interface 20 of the interface module 22.

Figure 5:
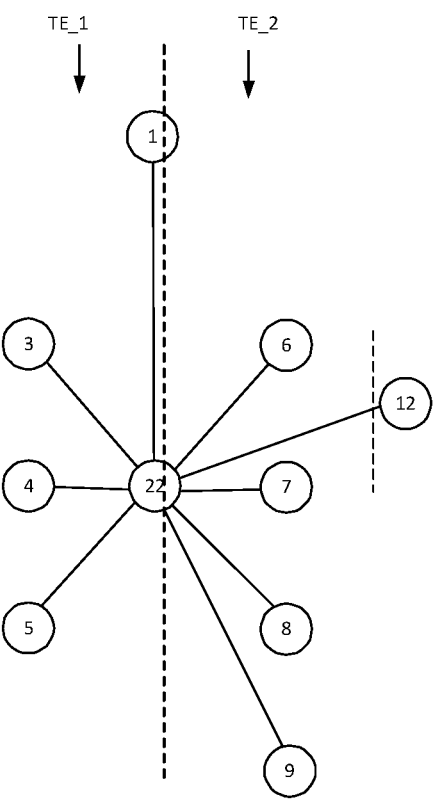
FIG. 5 Graph of the subset of a vehicle network with matrix coupler according to the present invention.

FIG. 5 depicts the star graph of the new wiring harness structure with matrix coupler 24 for two topology levels TE_1, TE_2.

Figure 6:
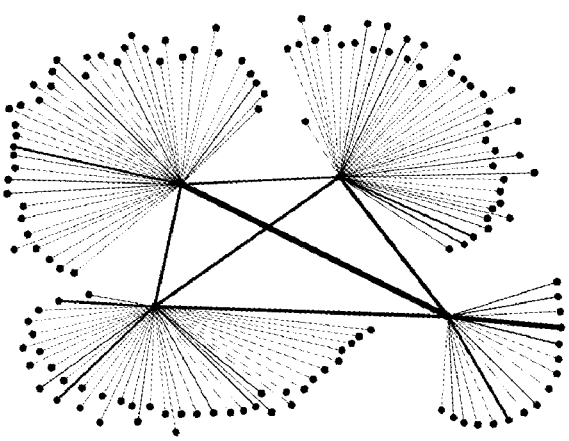
FIG. 6 Graph of a complete interior wiring harness with four matrix couplers according to the present invention.

FIG. 6 depicts the graph of a complete interior wiring harness, that is, an exemplary vehicle network BN, with four matrix couplers 24. Compared to FIG. 3, the considerably reduced complexity can be seen here.

FIG. 7 depicts the adjacency matrix to the graph of the conventional partial vehicle network according to FIG. 2. FIG. 8 depicts the adjacency matrix to the graph with matrix coupler according to FIG. 4. The connection relationships framed in FIG. 7 make the difference between the two adjacency matrices. According to this example, exactly these connections are provided by the matrix coupler 24 and do not have to be represented as complex interconnections in the wire harness.

Figure 9:
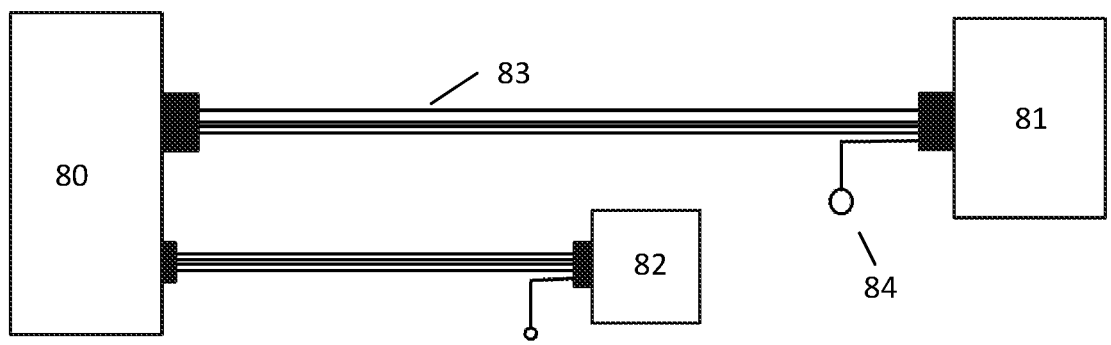
FIG. 9 Representation of the wiring harness elements according to the present invention FIG. 10 Device for producing the wiring harness elements according to the present invention.

FIG. 9 depicts the simplified structure of the physical vehicle network, that is, of an exemplary vehicle network BN, with multiple point-to-point connections 83 from the matrix coupler 80 to the vehicle network subscribers 81, 82. The ground connection 84 of the vehicle network subscribers 81, 82 can still be carried out at local ground points. Optionally, the matrix coupler 80 also distributes the ground potential. This is particularly advantageous for non-conductive or poorly conductive vehicle bodies.

Figure 10:
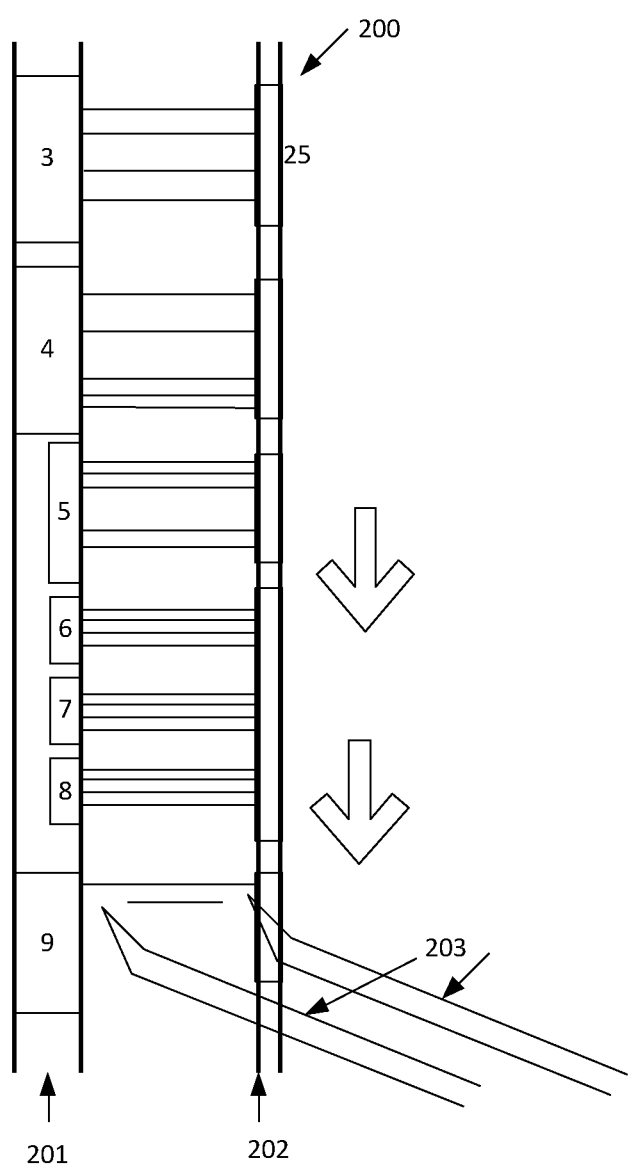

FIG. 10 depicts a device for manufacturing the simplified physical wiring harness, that is, an exemplary vehicle network BN, according to the vehicle network structure presented here with matrix coupler 80. The device comprises a rail or receptacle 201 in which the connectors of the vehicle network subscribers 3, 4, 5, 6, 7, 8, 9 are inserted by an automatic placement machine. The connector elements of the matrix coupler are fitted in the opposite receptacle 202. A pinning machine with the placement arms 203 now introduces each line with its contact left and right into the connector chambers left and right. It proceeds sequentially line by line and can insert all lines one after the other from top to bottom (or from bottom to top). The different cable lengths for each connector fall into a shaft between receptacles 201 and 202.

After the connectors are completely fitted with cables, they can be removed from a holder, for example, 202 and stretched for winding. In this way, complete wiring harness modules that do not require re-pinning, i.e., wiring harness bipartitions, are produced without a building board.

Figure 11:
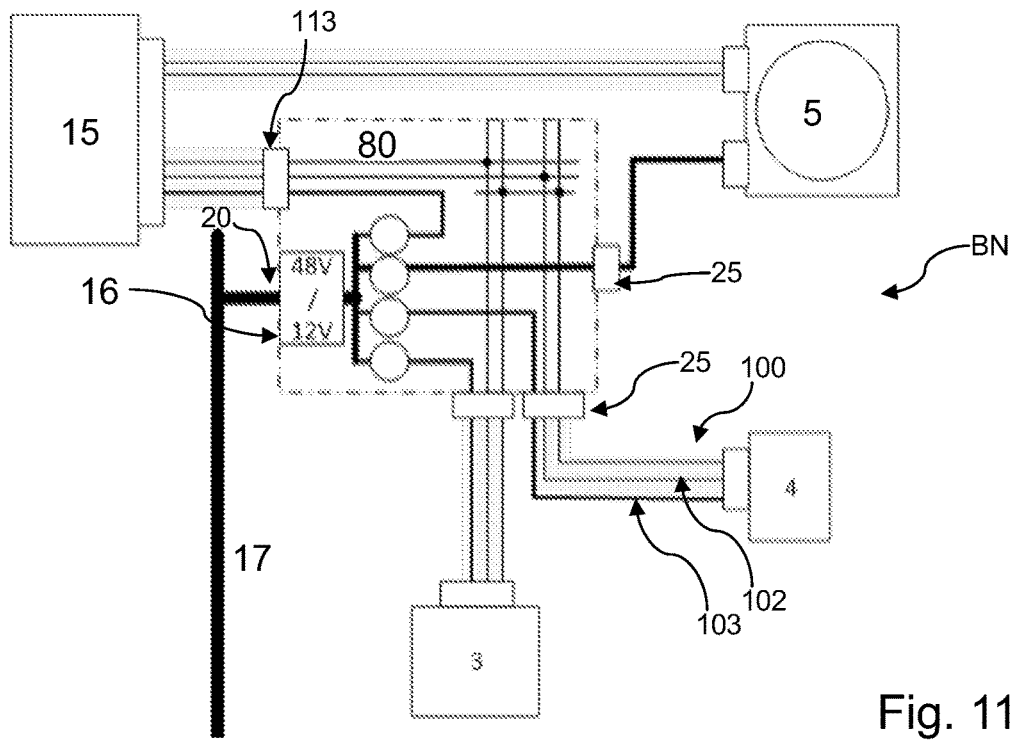
FIG. 11 Matrix coupler with integrated 48V/12V converter.

FIG. 11 depicts a partial electrical system for a motor function (vehicle network participant) 5 with the sensors (vehicle network participant) 3, 4 and the control unit 15. Here, the matrix coupler 80 contains a DC/DC converter, i.e., DC converter 16, from 48 V to 12 V. In this embodiment, a central 48 V to 12 V converter is dispensed with and the main supply is via a 48 V backbone 17. The current intensity on the 48 V supply backbone is thus reduced by a factor of 4 compared with a 12 V supply backbone.

In other words, FIG. 11 depicts a vehicle network BN for a vehicle (500). A plurality of vehicle network subscribers 3, 4, 5 is divided into at least two topology levels (TE1, TE2) to be distinguished spatially or functionally. The energy supply device 1 is represented by a 48 V backbone 17 and the vehicle network BN comprises a control unit 15. The interface module 22 for the network BN has a supply interface 20 which is coupled to a positive pole of the energy supply device 1 via the 48 V backbone 17. Furthermore, the interface module 22 comprises a communication interface 113 for receiving and/or transmitting information from the control unit 15 coupled thereto. A number of load interfaces 25 is further provided, wherein at least one load interface 25 of the number of load interfaces 25 is assigned to a respective vehicle network participant 3, 4, 5. The matrix coupler 80 in the interface module 22 is designed to couple the supply interface 20 and the communication interface 113 in each case with each load interface 25 of the number of load interfaces 25 and thus represents an interface between the at least two topology levels (TE1, TE2) to be distinguished. The matrix coupler 80 is further designed to represent an unbundling task for linking the vehicle network subscribers 3, 4, 5. The graphs representing nodes of a line-connector relationship of the matrix coupler 80 each denote a load interface 25 of the number of load interfaces 25 at the end of a line and an edge of the graph denotes a connection relationship of at least one line between a first load interface 25 and a second load interface 25, wherein the graph comprises at least two partite graphs having at least two partitions (TE1-MK, TE2-MK). A node of each graph is located on the matrix coupler 80. The interface module 22 is designed to provide an electrical protection of the number of load interfaces 25 to the vehicle networking subscribers 3, 4, 5.

A wiring harness segment 100 per vehicle network subscriber 3, 4, 5 of the plurality of vehicle network subscribers 3, 4, 5 has at least one first communication line segment 102, and a first power supply line segment 103 per wiring harness segment 100. In each case, a first end of the first communication line segment 102 and of the first power supply line segment 103 are bundled in a first interface at a first end of the at least one wiring harness segment 100.

Figure 12:
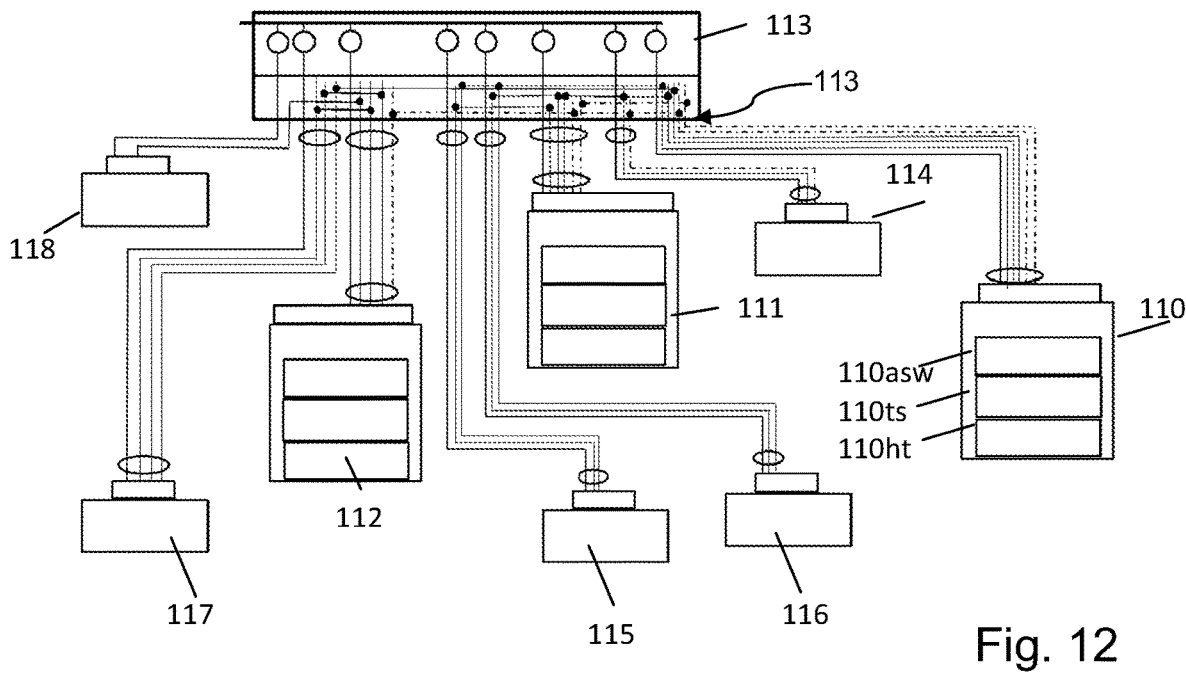
FIG. 12 Matrix coupler in a vehicle network with conventional ECU architecture.

FIG. 12 depicts a partial electrical system with matrix coupler 113, control units 110, 111, 112 and sensors/actuators 114, 115, 116, 117, 118. The sensors/actuators 114, 115, 116, 117, 118 can therefore be understood as vehicle network subscribers 114, 115, 116, 117, 118. The vehicle network structure is a star graph and therefore satisfies the new approach. However, the ECUs are still of conventional design and, according to a layer model, include the hardware level (HW driver), the driver level (software driver to the hardware and for communication) and the application software level in which the operating strategy is represented from the physical implementation of the function.

Figure 13:
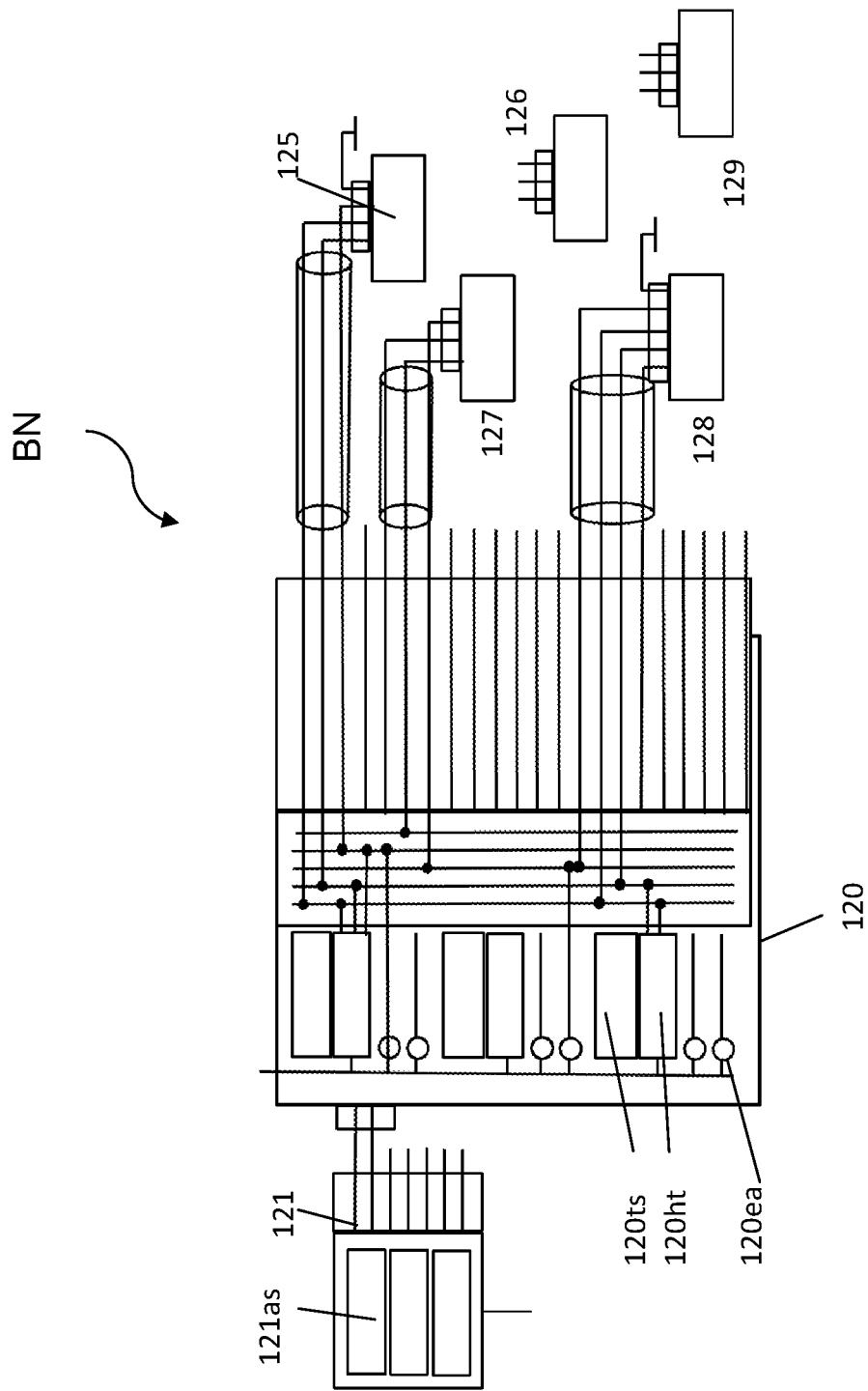
FIG. 13 Matrix coupler with integrated function HW drivers and SW drivers according to new vehicle on-board network architecture with high-performance computers.

FIG. 13 depicts a new electrical system, that is, vehicle network BN, which meets the requirement of bundling information processing in high-performance computers and to exempt the control units from it. Based on the introduction of high-performance computers in the vehicle, the integration of the remaining content of the ECUs into the matrix coupler 120 has now been implemented. The interface module with matrix coupler therefore also includes the hardware driver layer 120$hs$ and SW driver layer 120$ts$ for the functions. The Mosfet drivers 120$ea$ of the functions now simultaneously take over the electronic protection of the lines. The sensors and actuators 125, 126, 127, 128, 129 (vehicle network subscribers 125, 126, 127, 128, 129) are connected to the matrix coupler 120 via multiple point-to-point connections.

Figure 14:
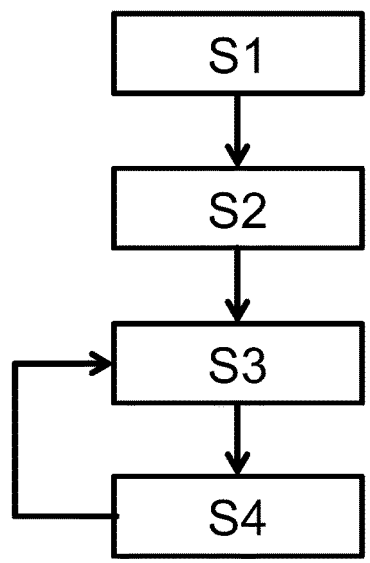
FIG. 14 a flow chart of a production process according to an embodiment of the present invention.

FIG. 14 depicts a schedule of a production process for a vehicle network of a vehicle. The production method comprises a step S1 of providing, a step S2 of providing, a step S3 of feeding and a step S4 of coupling. The steps S3 of the feeding and S4 of the coupling are executed repeatedly.

In step S1 of the provision, a plurality of vehicle network subscribers are provided in at least two topology levels TE1, TE2, which are to be differentiated spatially or functionally, an energy supply device, and at least one control unit. In step S2 of the provision, an interface module for the vehicle electrical system is provided. The interface module comprises a supply interface (22) for coupling to a positive pole of the energy supply device of the vehicle, a communication interface for receiving and/or transmitting information from a coupled or connectable control unit of the vehicle, a number of load interfaces, wherein at least one load interface of the number of load interfaces being assigned in each case to a vehicle network subscriber of the plurality of vehicle network subscribers, and at least one matrix coupler.

The matrix coupler is designed to couple the supply interface as well as the communication interface respectively to each load interface of the number of load interfaces and thus to represent an interface between the at least two topology levels (TE1, TE2) to be distinguished, wherein the matrix coupler is set up to represent an unbundling task for linking the vehicle network subscribers, wherein nodes of a line-connector relationship of the matrix-coupler represent graphs of a load designate the interface of the number of load interfaces at the end of a line, and wherein one edge of the graph indicates a connection relationship of at least one line between a first load interface and a second load interface, wherein the graph comprises at least two partite graphs having at least two partitions (TE1-MK, TE2-MK), wherein the eigenvector of a respective adjacent matrix of the two partitions (TE1-MK, TE2-MK) is symmetrical to zero, and where a node of each graph is located on the matrix coupler. The interface module is designed to electrically secure the number of load interfaces to the vehicle network subscribers.

In step S3 of the feed, a first wiring harness segment, comprising at least one first communication line segment, and a first energy supply line segment, is fed, wherein a first end of each of the first communication line segment and of the first energy supply line segment are bundled at a first end of the at least one wiring harness segment in a first interface. In step S4 of the coupling, a second end of the first wiring harness segment opposite the first end is coupled to a first load interface of the plurality of load interfaces. The steps of feeding S3 and coupling S4 for each load of the plurality of loads are repeated according to the number of load interfaces or on-board network subscribers.

Figure 15:
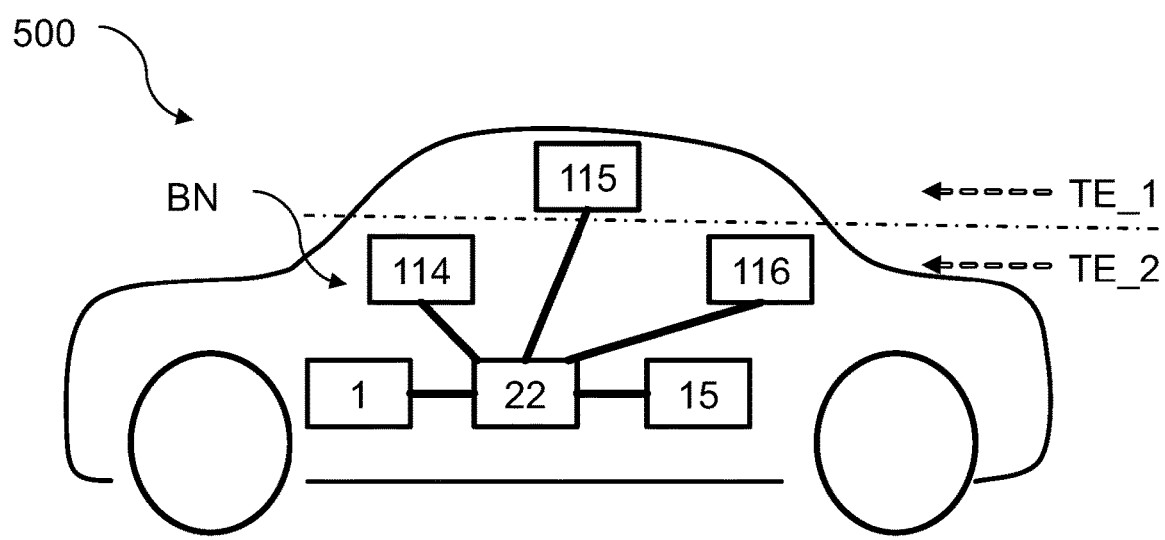
FIG. 15 is a vehicle with a vehicle network according to an embodiment of the present invention.

FIG. 15 depicts a vehicle with an on-board vehicle network BN. The on-board vehicle network BN comprises a plurality of vehicle network subscribers 114, 115, 116 which are arranged in two topology levels TE_1, TE_2 that are to be distinguished spatially or functionally. The vehicle network BN further comprises an energy supply device 1 and a control unit 15. All these components are coupled to each other via an interface module 22.

The figures are merely schematic representations and serve only to explain the invention. Elements that are identical or have the same effect are consistently marked with the same reference signs.

The invention claimed is:

1. A method of manufacturing of a vehicle network of a vehicle, the method comprising the steps of:
   a. Providing
      i. a plurality of vehicle network subscribers in at least two topology levels to be spatially or functionally distinguished,
      ii. an energy supply device, and
      iii. at least one control device;
   b. Providing an interface module configured for the vehicle network, wherein the interface module comprises:
      i. a supply interface for coupling to a positive pole of the energy supply device of the vehicle,
      ii. a communication interface for at least one of receiving and transmitting information from a coupled or connectable control device of the vehicle,
      iii. a number of load interfaces, each having a vehicle network subscriber of the plurality of vehicle network subscribers and wherein at least one load interface is associated with the number of load interfaces,
      iv. at least one matrix coupler, the supply interface and the communication interface each having each load interface of the number of load interfaces and thus represent an interface between the at least two topology levels to be distinguished, and wherein the matrix coupler is configured to couple the number of load interfaces to each other,
         wherein the matrix coupler is set up to represent an unbundling task for linking the vehicle network subscribers,
         wherein nodes of a graph representing line-connector relationships of the matrix coupler each denote a load interface the number of load interfaces at an end of a line,
         wherein one edge of the graph represents a connection relationship of at least one line between a first load interface and a second load interface,
         wherein the graph comprises at least two partite graphs with at least two partition, and
         wherein one node of each graph is located on the matrix coupler,
      v. wherein the interface module is set up to carry out an electrical protection of the number of load interfaces to the vehicle network subscribers,
   c. supplying a first wiring harness segment comprising at least one first communication line segment, and a first energy supply line segment, wherein a first end of the first communication line segment and the first power supply line segment are bundled in a first interface at a first end of the at least one wiring harness segment;
   d. coupling a second end of the first line set segment opposite the first end to a first load interface of the number of load interfaces; and
   e. repeating the steps of feeding and coupling for each vehicle network subscriber of the plurality of vehicle network subscribers in order to produce an automatically producible vehicle network system with an unbundling within the matrix coupler.

2. The method according to claim 1, further comprising the step of assembling the wiring harness segment prior to the step of feeding the wiring harness segment, wherein per vehicle network subscribers the plurality of vehicle network subscribers assembles a wiring harness segment comprising a communication line segment and power supply line segment are of the same length, and wherein in each case a first end of the communication line segment and of the energy supply line segment are bundled at a first end of the wiring harness segment in an associated interface.

3. The method according to claim 1, wherein the graph comprises two bipartite graphs having two bipartitions.

4. The method according to claim 1, wherein each eigenvector of a respective adjacent matrix of the two bipartitions is symmetrical to zero, and wherein one node of each graph lies on the matrix coupler.

5. The method according to claim 1, wherein at least one of the interface module comprises electronic fuses and the matrix coupler comprises electronic fuses arranged to provide the electrical protection of the number of load interfaces to the vehicle network subscribers.

6. The method according to claim 1, wherein the electrical protection of the load interfaces and thus the line set segments to the vehicle network subscribers is carried out electronically with at least one of Mosfet switches, intelligent fuse characteristics and fuses.

7. The method according to claim 1, wherein the interface module is configured to perform at least one of a control function and a sensor evaluation for at least one of an vehicle network subscriber several vehicle network subscribers and all vehicle network subscribers of the connected plurality of vehicle network subscribers.

8. The method according to claim 1, wherein the number of load interfaces are at least one of a plug, a socket, transfer support point and splice.

9. The method according to claim 1, wherein the communication line segment is a film conductor.

10. The method according to claim 1, further comprising the step of coupling the supply interface of the interface module to the positive pole of the energy supply device by means of an energy supply line and the communication interface by means of a communication line with the control unit.

11. The method according to claim 1, wherein the step of providing the interface module further comprises providing a ground interface configured for coupling to a negative pole of the energy supply device, and wherein in the step of feeding a ground line is supplied, wherein the matrix coupler is designed to couple the ground interface to at least one, a part or each load interface of the number of load interfaces.

12. The method according to claim 1, wherein the interface module comprises a DC/DC converter connected on an input side to the supply interface and which is set up on the supply interface to convert the present first voltage level to a second voltage level different from the first voltage level and to provide the second voltage level on the output side to the matrix coupler, wherein the matrix coupler is configured to provide at least one of the first voltage level and the second voltage level interface-individually of the number of load interfaces.

13. The method according to claim 1, wherein at least one of the first voltage level is higher than the second voltage level and the first voltage level is 48 V and the second voltage level is 12 V.

14. The method according to claim 1, wherein, at least one of the interface module comprises electronic fuses, and the matrix coupler comprises electronic fuses.

15. A vehicle network system for a vehicle, comprising:
  a. a plurality of vehicle network subscribers in at least two topology levels to be distinguished spatially or functionally,
  b. an energy supply device,
  c. at least one control unit,
  d. at least one interface module for the vehicle network, comprising:
   i. a supply interface for coupling to a positive pole of the energy supply device of the vehicle,
   ii. a communication interface for at least one of receiving and transmitting information from a coupled or connectable control unit of the vehicle,
   iii. a number of load interfaces, each having a vehicle network subscriber of the plurality of vehicle network subscribers, wherein at least one load interface is associated with the number of load interfaces,
   iv. at least one matrix coupler is configured to couple the supply interface and the communication interface respectively to each load interface of the number of load interfaces and thus represent an interface between the at least two topology levels to be distinguished,
    wherein the matrix coupler is set up to represent an unbundling task for linking the vehicle network subscribers,
    wherein nodes of a graph representing line-connector relationships of the matrix coupler each denote a load interface of the number of load interfaces at the end of a line,
    wherein an edge of the graph denotes a connection relationship of at least one line between a first load interface and a second load interface,
    wherein the graph comprises at least two partite graphs with at least two partition, and
    where one node of each graph is located on the matrix coupler, and
   v. wherein the interface module is designed to carry out an electrical protection of the number of load interfaces to the vehicle network subscribers, and
  e. a wiring harness segment for each vehicle network subscriber of the plurality of vehicle network subscribers, having at least a first communication line segment, and a first energy supply line segment per wiring harness segment, wherein a first end of the first communication line segment and the first energy supply line segment are bundled at a first end of the at least one wiring harness segment in a first interface.

* * * * *